(12) United States Patent
Hakola

(10) Patent No.: US 7,404,491 B2
(45) Date of Patent: Jul. 29, 2008

(54) CYCLONE WITH IN-SITU REPLACEABLE LINER SYSTEM AND METHOD FOR ACCOMPLISHING SAME

(76) Inventor: Gordon R. Hakola, 5219 N. Casa Blanca Dr., #56, Paradise Valley, AZ (US) 85253

( * ) Notice: Subject to any disclaimer, the term of this patent is extended or adjusted under 35 U.S.C. 154(b) by 6 days.

(21) Appl. No.: 11/703,926

(22) Filed: Feb. 9, 2007

(65) Prior Publication Data

US 2007/0131594 A1    Jun. 14, 2007

Related U.S. Application Data

(62) Division of application No. 10/716,711, filed on Nov. 19, 2003, now Pat. No. 7,185,765.

(51) Int. Cl.
*B04C 5/00* (2006.01)
(52) U.S. Cl. .................... 209/715; 209/717
(58) Field of Classification Search ................ 209/715, 209/719, 734, 711
See application file for complete search history.

(56) References Cited

U.S. PATENT DOCUMENTS 3,902,601 A * 9/1975 Townley .................. 209/720
4,514,934 A * 5/1985 Ray et al. .................. 451/7
4,623,458 A * 11/1986 Hakola .................. 210/238
7,255,790 B2 * 8/2007 Rogers et al. ............ 210/512.1
7,347,332 B2 * 3/2008 Hakola .................. 209/715

* cited by examiner

*Primary Examiner*—Patrick Mackey
*Assistant Examiner*—Kaitlin S. Joerger
(74) *Attorney, Agent, or Firm*—Herbert E. Haynes, Jr.

(57) ABSTRACT

Cyclones having abrasion resistant liners with a system and method for replacing the liners when they worn out due to the destructive nature of the materials being classified in the cyclone. The cyclone includes segmented inlet housing liners which are separately removable through the opened top of the cyclone housing. A lifting ring in the bottom of a conical housing has an apex cone and plural cone liners supported in a stacked array thereon within the conical housing and hoisting straps are used to lift the lifting ring, the apex cone and the array of cone liners out of the opened top of the cyclone housing without having to remove the cyclone from its operating position and completely disassemble the cyclone. Wear detector bolts attach the inlet head liners and a cage-like conical housing allows direct viewing of wear detecting weep holes provided in the liners mounted therein.

16 Claims, 12 Drawing Sheets

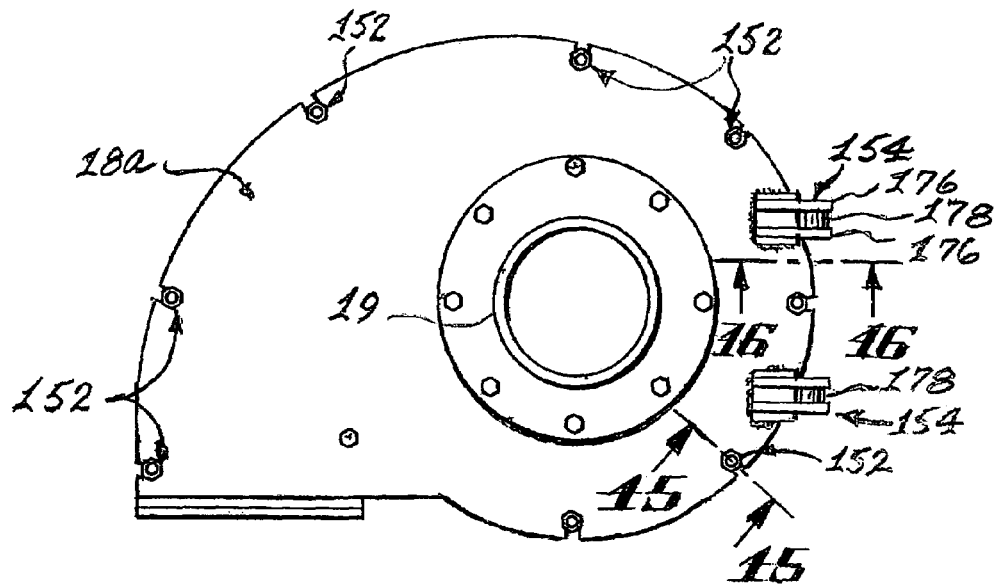
Fig-14
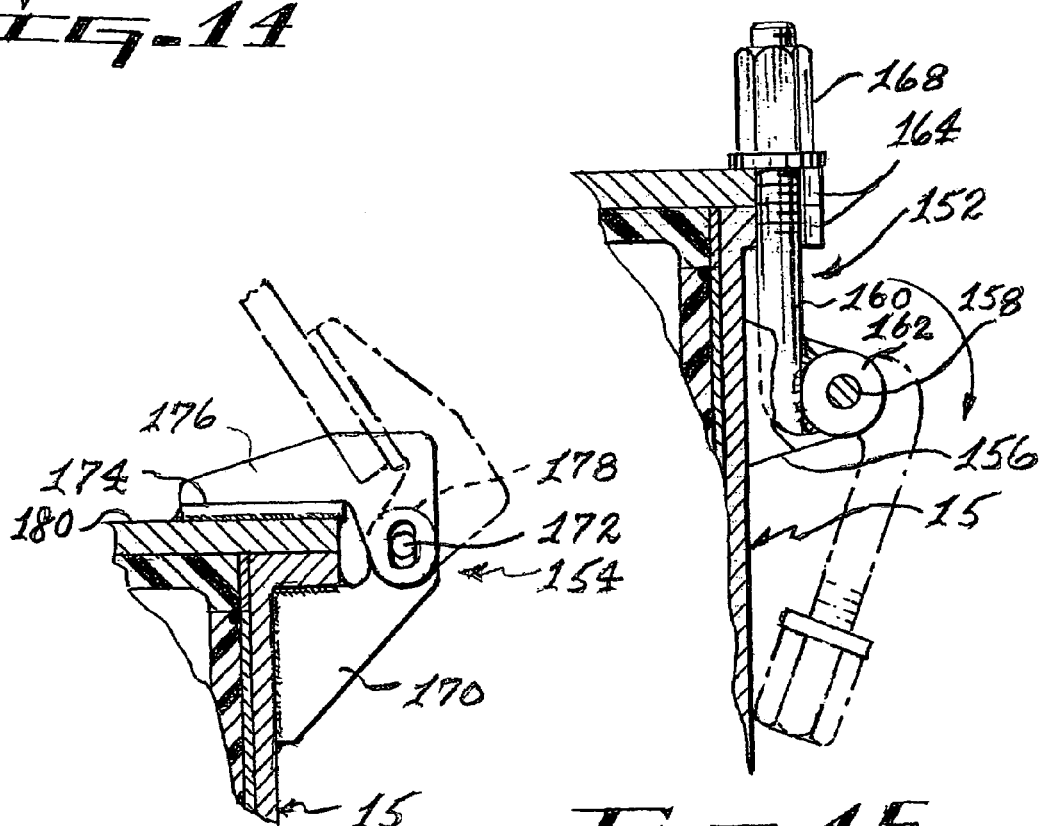
Fig-16
Fig-15

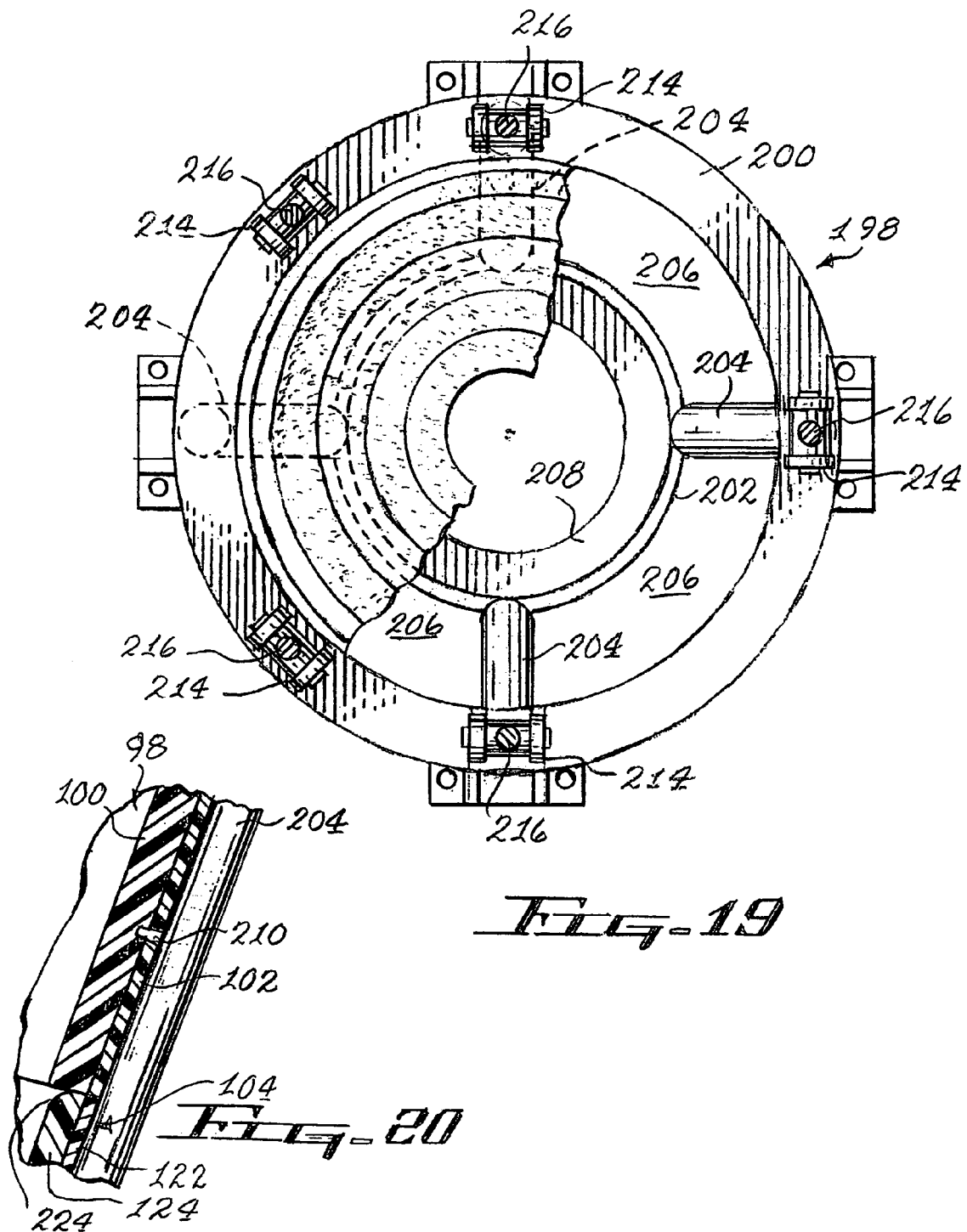

CYCLONE WITH IN-SITU REPLACEABLE LINER SYSTEM AND METHOD FOR ACCOMPLISHING SAME

CROSS REFERENCE TO A RELATED APPLICATION

This application is a divisional application of prior application Ser. No. 10/716,711 for Cyclone with in-situ liner replacement system and method of accomplishing same, filed on Nov. 19, 2003 now U.S. Pat. No. 7,185,765 by the same inventor.

BACKGROUND OF THE INVENTION

1. Field of the Invention

This invention relates in general to cyclones and more particularly to especially configured cyclones with a liner system and method by which worn liners are replaced with a minimal expenditure of time and labor and without having to remove the cyclones from their mounting bases.

2. Description of the Prior Art

Cyclones are mechanisms that are used in various industries to separate different sized particles that are fed as a mixture into the inlet of the cyclone. In the mineral processing industries such as for example in the processing of copper, iron ore, lead/zinc, gold, coal and the like, a plurality of large cyclones are typically carried in mounting bases arranged in a cluster over a "tub". Each of the cyclones are in circuit with grinding mills and a slurry of water and the mineral to be classified is fed into the inlet of the cyclone. The heavier materials in the slurry exit the cyclone through an underflow outlet at the bottom of the cyclone and are returned to the grinding mill. The lighter materials are carried upwardly in a vortex created within the cyclone and exit through an overflow outlet nozzle at its upper end. The primary components of a cyclone include an inlet housing having a feed duct and a cylindrical head section, a head section cover plate, a downwardly tapering conical housing depending from the head section, an apex cone at the lower end of the conical housing with the course material underflow outlet at the lower end of the apex cone, and an internal vortex finder coupled to the fine materials overflow outlet nozzle.

The feed duct of cyclones is often referred to as an involute which receives the slurry at high velocity from the grinding mill and directs it tangentially into the cylindrical head section of the cyclone. As the slurry swirls around in the head section the weight of the slurry, and particularly the large particles, will tend to fall downwardly into the conical housing of the cyclone. The larger particles and the water carrying them will move downwardly through the apex cone and will exit the cyclone through the underflow outlet. A vortex consisting of smaller particles and the water carrying them is created within the apex cone and moves upwardly through the center of the conical housing into the vortex finder and exits the cyclone through the overflow outlet.

The feed duct, inlet head section, head section cover plate, conical housing, apex cone and the vortex finder of large cyclones of the type used in mineral processing are provided with liners which protect these components from the destructive forces imparted by highly abrasive slurries as they move through the cyclones.

As disclosed in a paper entitled "Krebs Elastomer Liner Installation Instructions", which is available on the internet at the krebs.com web site, gum rubber is the most commonly used liner material and synthetic rubber materials are also used in applications where gum rubber is not well suited. Such synthetic rubber-like materials include Neoprene, Nitrile/bunaN, Butyl, urethane and the like. Elastomeric liners are molded structures which historically are provided with annular flanges that are secured between the mating flanges of the different cyclone housing components to hold the liners in place. It is a common practice to affix these molded liners to the interior walls of the cyclone components by means of a suitable adhesive. The liners are designed to be a form fit within their respective components and compressive forces are used to install and fit the liners within each of the housing components and these forces must be maintained while the adhesive cures. In large cyclones, such as those having head section diameters of 26, 30, 33 inches, the conical housing is an assembly usually formed of two or more cone shaped housings which are bolted together at their mating flanges, and the conical housing assembly is similarly bolted to the lower end of the cylindrical head section after the large one piece liner is installed in the head section. The apex cone is bolted to the lower end of the conical housing assembly in some cyclones while others are attached by a quick release clamp as disclosed in my U.S. Pat. No. 4,541,934. In liner replacement operations involving these elastomeric liners, the cyclone housing must be disassembled, that is, the apex cone, the two or more cone shaped housings which form the conical housing assembly and the inlet housing are separated from each other and the head section cover plate is removed. This provides the access needed to peal the worn liners out of the several cyclone housing components and subsequently to apply the adhesive, install the new liners and exert the compressive forces needed to fit new liners.

As hereinbefore discussed, gum rubber is the most commonly used liner material and this is due to it providing the longest possible wear life in most applications. Alternative liner materials are used in applications where natural gum rubber is unsuitable. Synthetic rubber is used when temperature or the slurry constituents do not allow the use of natural gum rubber. Reinforced highly resilient urethane in used in applications in which rubber liners are torn rather than worn. Ceramic and silicone materials are typically used in high wear areas of the cyclone and, for example, in the coal industry such liner materials are used throughout the entire cyclone. As was the case with the replacement of rubber liners, the entire cyclone must be disassembled to accomplish replacement of the liners formed of these alternate materials. Typical installation of such liners is discussed in a paper entitled "Installation of Ceramic Parts into Krebs D-Series Cyclones" which is available on the internet at the krebs.com web site. These types of liners are molded or cast and are assembled and fit individually into the disassembled housing components which form the cyclone. The inlet head section liner is a large one piece structure which is inserted into the inlet head housing and rubber wedges are used to center the liner in the head section. The cover plate and cover plate liner is then mounted on the inlet housing which is turned upside down. The liners are inserted into the cone shaped sections and gaskets and spacer rings are then inserted sequentially between the flanges which join the inlet head section to the uppermost cone portion, and between the flanges which join the two or more conical sections to each other. The gaskets are sized so that the abutting edges of the liners are in contact with each other and a bead of silicone sealant is applied to the abutting edges to aid in sealing the joints. The liner is then inserted into the apex cone and it is then connected to the lowermost cone section of the conical housing. The cyclone is then set on its side and the feed duct and vortex finder are then attached to complete the reassembly of the cyclone.

Disassembly of large cyclones for the purpose of replacing worn liners is very labor intensive and time consuming. The first problem associated with such operations is the need for removal of the cyclone from its mounting base in the cluster of cyclones and transporting it to a dedicated repair facility or simply laying it on its side in a suitable maintenance area away from the cluster. Cyclones of this type are very awkward and can weigh up to about 5,000 pounds. Thus, the operator of the crane needed to remove and transport the cyclone must be careful not to damage the cyclone or adjacent equipment and must be skillful to precisely align the cyclone for reconnection to the material handling pipes when it is being returned to its operational position. The second problem in such operations is removal of the multiplicity of nuts and bolts which hold the various cyclone components together and typically the nuts and bolts will number between 50 and 75 depending on the size of the cyclone. There are some places on cyclones where power tools will not fit and in all cases the cyclones which are laying on their sides during this phase of the replacement operation must be moved to provide the needed access. Further, due to the hostile environment in which cyclones operate, the nuts and bolts are often rusted and must in many instances be heated or cut off to remove them.

The traditional way to determine when cyclones are in need of liner replacement is to periodically inspect the liners until accurate records of the wear characteristics are collected at which time replacement schedules can be established based upon operating time. Conducting periodic inspections of the liners is labor intensive in that access to the interior of the cyclones is needed to conduct the inspections and of course operation of the cyclone must be interrupted during the inspections.

Therefore, a need exist for a new and useful cyclone with a special liner replacement system and method which overcomes some of the problems and shortcomings of the prior art.

SUMMARY OF THE INVENTION

The present invention discloses cyclones having a special liner arrangement for in-situ replacement of worn out liners which eliminate the need for completely disassembling the cyclone housing during a liner replacement operation. Also disclosed is a method for accomplishing the in-situ liner replacement.

The special liners each include a rigid substrate formed of suitable material such as metal, rigid urethane or the like, with an abrasion resistant material such as rubber, high energy (soft) urethane, ceramic or other suitable liner material bonded to the substrate. The substrates are manufactured so as to conform to the shape of the particular interior wall section of the cyclone housing adjacent to which they will be placed, and the abrasion resistant materials are bonded to the interior surfaces of the substrates.

The slurry inlet housing of the cyclone includes a transition duct portion which converts the slurry flow from a round in-cross-section flow provided by a supply pipe from the product grinding mill to the square in-cross-section flow within a feed duct section of the inlet housing. The feed duct, is sometimes referred to as an involute due to its shape and it feeds the slurry to be processed tangentially into the cylindrical head section of the inlet housing. The liner used in the transition duct section of the slurry inlet is especially configured to produce the change in flow configuration and is a one piece structure having a flange which is disposed between the flanges of the supply pipe and the transition duct section. At least three separate liner segments are used in the feed duct and the cylindrical head section of the inlet housing, rather than the prior art one piece liner, to facilitate installation, fitting and subsequent removal. The liner segment used in the feed duct is configured in the involute shape of the duct and is of upwardly opening U-shape in-cross-section so that when installed it will line the bottom and side walls of the feed duct. The liner segments used in the cylindrical portion of the head section of the inlet housing are of arcuate configuration to line the interior side walls of the cylindrical head section of the inlet housing. The open top of the feed duct and the head section are closed by a cover plate and a cover plate liner which is located in the upper end of the inlet housing below the cover plate.

The cyclone housing also includes a cylindrical vortex finder mounted in the cover plate so as to extend axially down into the head section of the inlet housing. The vortex finder is fabricated with a rigid urethane substrate to which suitable abrasion resistant exterior and interior liners are bonded. When the vortex liners are worn out, replacement is accomplished by removing attaching bolts an pulling the finder axially out of the cover plate.

The feed duct liner and the arcuate liner segments used in the inlet housing of the cyclone are held in contiguous engagement with the interior surfaces of their respective sections of the inlet housing by special fasteners. In addition to securing liners in place the special fasteners act as wear detection devices which provide an indication that liner wear is nearing the point that a replacement operation should be scheduled. The head section housing is provided with an opening at each location that a special fastener is to be used, and a bolt is positioned to extend through the opening into threaded engagement with a captive nut mounted on the interior surface of the rigid substrate of the liner. The nut is affixed to the substrate prior to bonding of the abrasion resistant material on the substrate and the bolt is sized so that its inner end is at a predetermined depth within the liner material. The bolt has an axial bore formed there through so that when the bonded liner material wears to a point where the inner end of the bolt is exposed, a small amount of the slurry will leak out through the bolt and thus provide a visual indication on the exterior of the cyclone housing that liner replacement will soon be needed.

The cyclone housing further includes a conical housing assembly which tapers downwardly from its relatively large upper end to its smaller lower end and is dependingly attached to the open lower end of the head section of the inlet housing. The liners used in the conical cyclone housing include an upper cone liner, a middle cone liner and a lower cone liner and a apex cone. The upper and middle cone liners are preferably made with a high energy (soft) abrasion resistant material such as urethane bonded to the rigid substrate as described above and may be described as "drop-in" structures which fit in their proper positions within the conical housing due to the matching tapered configurations of the housing and the liners. The lower cone and the apex cone are preferably provided with ceramic liner materials which together taper from the upper end of the lower cone to a cylindrical outlet at the bottom of the apex cone. The rigid substrates of the lower cone and the apex cone are of special configuration by which the upper, middle, lower cone liners and the apex cone can be extracted from the conical cyclone housing by a lifting device which will be described below. The upper end of the outer surface of the rigid substrate of the lower cone liner is of conical configuration with the lower portion thereof being cylindrical. A radially extending annular flange is formed on the apex cone and is positioned to circumscribe the open upper end thereof. The lower end of the apex cone is cylindrical and has an annular groove in its outer surface. When installed in the conical cyclone housing, the lower end of the lower cone rests on the annular flange of the apex cone and they cooperatively form a cylindrical configuration at the junction of the lower cone and the apex cone. The conical cyclone housing is especially configured to provide a cylindrical lower end the open lower end of which is circumscribed by an inwardly extending ring-shaped shelf. The cylindrical configuration formed at the junction of the lower cone and the apex cone is located in the cylindrical lower end of the conical cyclone housing when the lower cone and the apex cone are mounted therein.

A cylindrical anti-splash skirt of tubular shape is mounted so as to depend from the lower end of the apex cone. The cylindrical body of the skirt is formed of high energy (soft) urethane and an inwardly extending flange circumscribes the open upper end of the skirt. The inherently resilient nature of the skirt material allows it to be installed and subsequently removed by snapping it onto the cylindrical lower end of the apex cone with the flange of the skirt being disposed in the annular groove of the apex cone. An optional snap-in liner of resilient material can be installed inside the anti-splash skirt.

A circular lifting ring is supported on top of the ring-shaped shelf provided at the lower end of the cyclone housing with the flange of the apex cone resting on the lifting ring. The body of the apex cone and the splash skirt extend axially downwardly through the lifting ring and depend from the open lower end of the conical housing. The lower, middle and upper cones are arranged in an axially stacked array on the upper surface of the flange of the apex cone and will move as an entity when the lifting ring is moved upwardly toward the inlet section of the cyclone housing.

A pair of hoisting straps are attached to diametrically opposed sides of the lifting ring and extend upwardly therefrom between the exterior of the axially stacked conical liner array and the inner surface of the conical cyclone housing. The upper ends the hoisting straps each pass through a different one of a pair of diametrically opposed slots formed proximate the lower end of the head section of the inlet housing so that the upper ends of the straps are stored outside the cyclone housing until needed to accomplish a liner replacement operation.

The method of the present invention for in-situ replacement of cyclone liners includes the initial step of disconnecting the slurry supply and overflow pipes from the cyclone to be serviced followed by the step of removing the cover plate and cover plate liner. Prior to removing the cover plate and cover plate liner, the optional step of removing the overflow nozzle and vortex finder may be accomplished or they can be left in place and removed along with the cover plate. Then the segmented inlet head liners and the feed duct liners are removed, followed by fishing the upper ends of the hoisting straps through the slots formed in the head section of the cyclone housing to move them into the interior of the cyclone head section. Then the upper ends of the hoisting straps are connected to a suitable bail that is coupled to a crane which pulls the hoisting straps, and the lifting ring and the stacked liner array and apex cone upwardly in the cyclone housing. The next step is interrupting the upward movement of the lifting ring when the upper cone liner clears the open upper end of the cyclone housing and removing the upper cone liner manually from the stacked array of liners. The next step is restarting the upward movement of the lifting ring until the middle cone liner clears the open upper end of the cyclone and halting the upward movement so that the middle cone liner can be manually removed from the stack. The next steps includes repeating the step of restarting and subsequently interrupting the upward movement of the lifting ring until the lower cone and the apex cone have been removed from the cyclone housing. The cyclone liner replacement operation is completed by the steps of inspecting the liners and replacing those showing excessive wear with new liners and installing them in the cyclone housing by performing the above recited steps in the reverse order.

In addition to the special liner arrangement and method for in-situ replacement of worn out-liners, a modified cyclone housing is disclosed as having a one piece open-sided cage-like conical housing with the cone liners contained therein being in plain view. This allows wear indicators provided at various locations in the cone liners and the apex cone to be inspected for indication of wear without interrupting operation of the cyclone. The wear indicators are in the form of weep holes having their inner ends buried beneath the inner surfaces of the abrasion resistant materials so that when the inner ends of the weep holes are opened into the interior of the cyclone as a result of material wear, the slurry liquid will seep out of the weep holes and provide a visual indication that a liner replacement operation should be scheduled. Also, modifications of the cyclone assembly techniques are disclosed to replace the prior art bolted assembly technique.

BRIEF DESCRIPTION OF THE DRAWINGS

FIG. 14 is a top view similar to FIG. 2 but showing a second embodiment of a cover plate attachment arrangement.

FIG. 15 is an enlarged fragmentary sectional view taken along the line 15-15 of FIG. 14.

FIG. 16 is an enlarged fragmentary sectional view taken along the line 16-16 of FIG. 14.

FIG. 19 is an enlarged sectional view taken along the line 19-19 of FIG. 18 with portions of the view being broken away to show the various features thereof.

FIG. 20 is an enlarged view of the encircled portion 20 of FIG. 19.

DESCRIPTION OF THE PREFERRED EMBODIMENT

Figure 1:
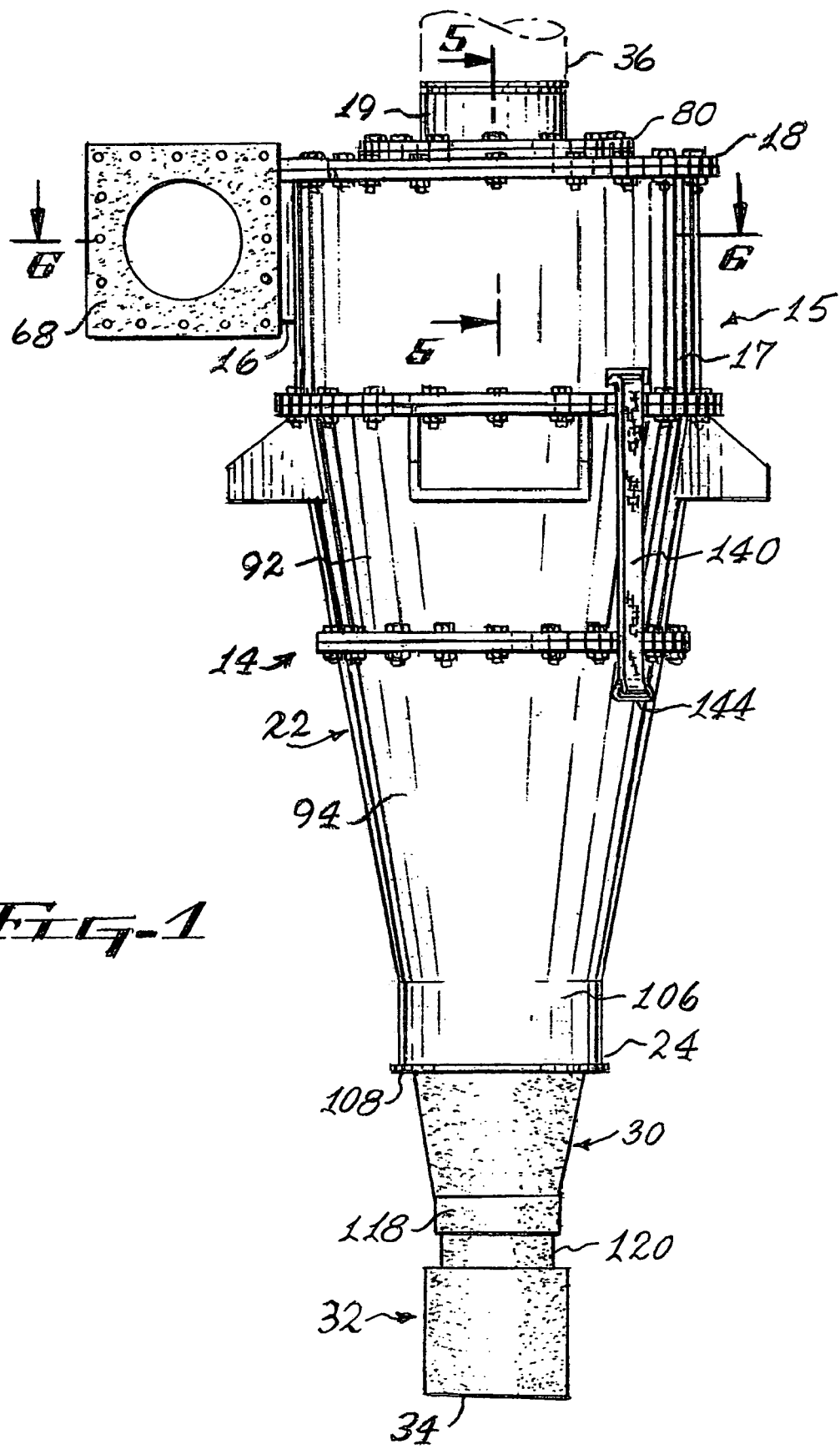
FIG. 1 is an elevational view of a cyclone incorporating the features of the present invention.

Referring more particularly to the drawings, FIG. 1 shows a typical cyclone which is indicated in its entirety by the reference numeral 14. To insure a clear understanding of the present invention, the basic components and features the cyclone 14 will now be described. Briefly, the cyclone 14 includes an inlet housing 15 having a feed duct section 16 and a cylindrical head section 17. The top of the inlet housing 15 is closed by a removable cover plate 18 having an overflow nozzle 19 mounted thereon which is in communication with a vortex finder 20 that depends from the cover plate 18 axially into the cylindrical head section 17 of the inlet housing 15. A conical housing 22, which is usually an assembly including two or more truncated conical housings, depends axially from the cylindrical head section 17 and is disposed so that its small apex end 24 is at the lower end of the conical housing. The conical housing 22 shown in the accompanying drawings is not typical in that it is especially configured for reasons which will become apparent as this description progresses.

Figure 2:
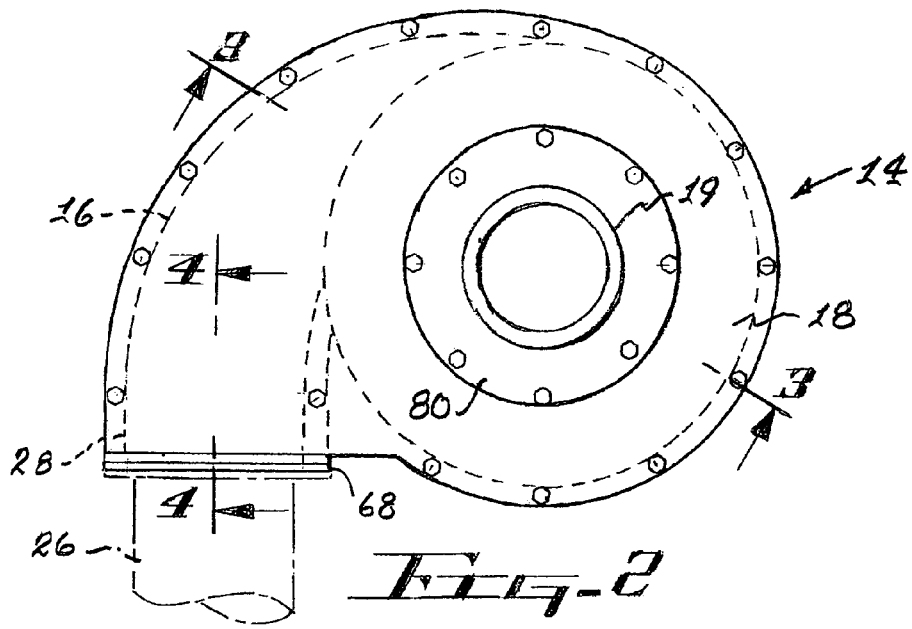
FIG. 2 is a top view of the cyclone shown in FIG. 1.
Figure 3:
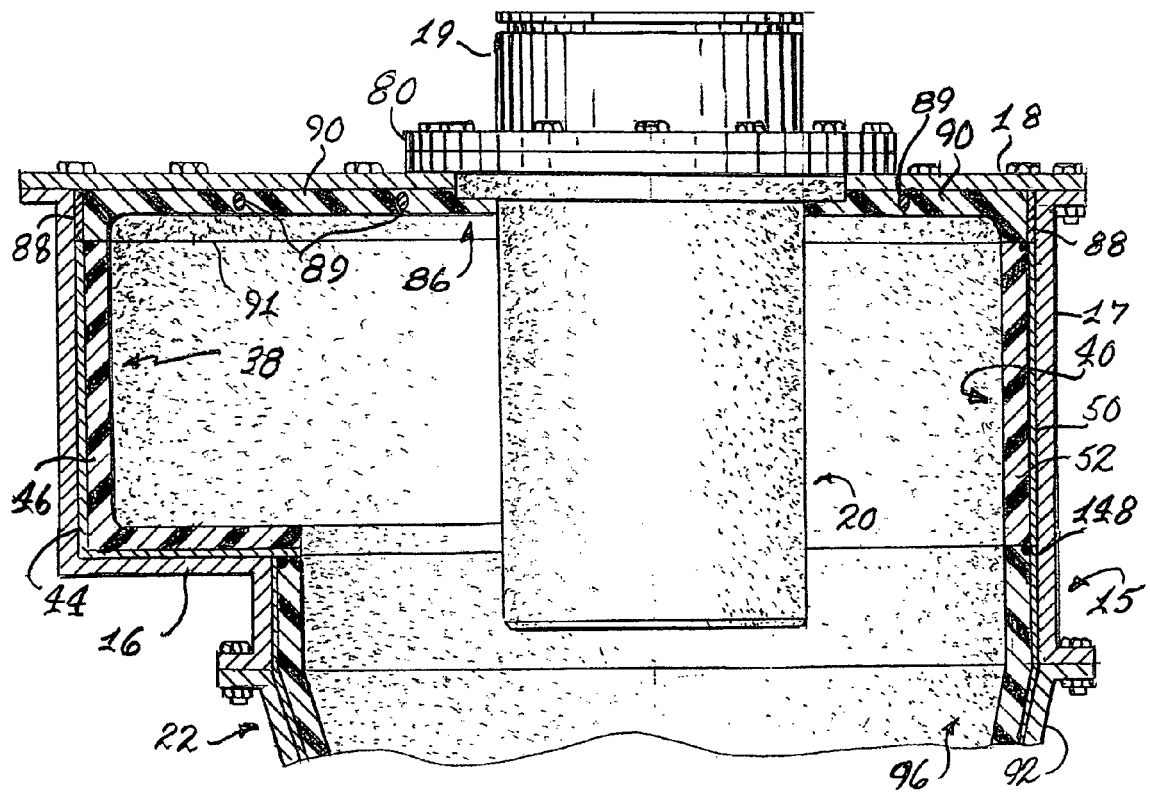
FIG. 3 is an enlarged fragmentary sectional view taken along the line 3-3 of FIG. 2.
Figure 4:
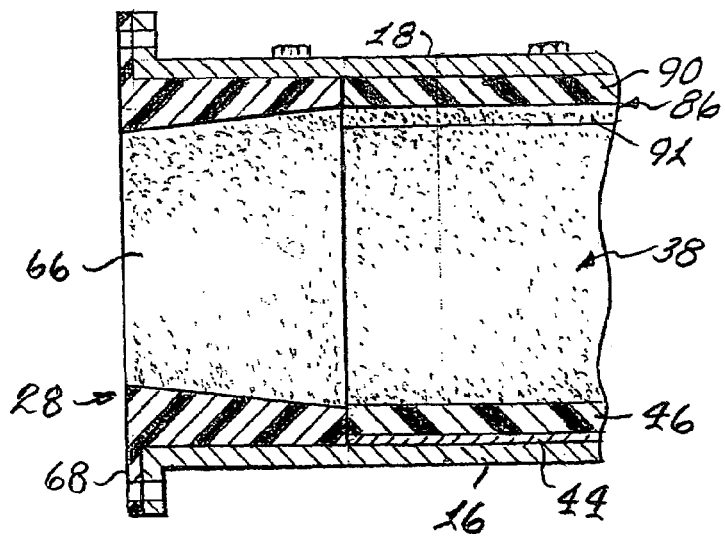
FIG. 4 is an enlarged fragmentary sectional view taken along the line 4-4 of FIG. 2.
Figure 6:
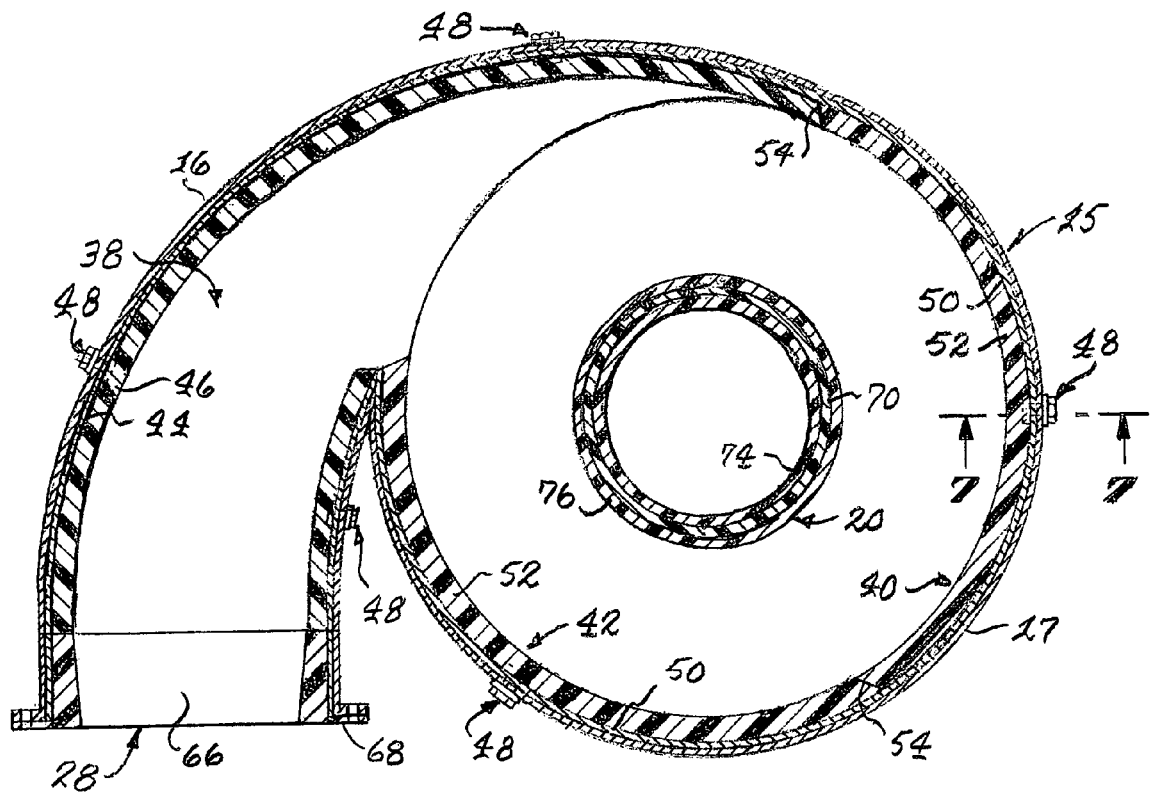
FIG. 6 is an enlarged fragmentary sectional view taken along the line 6-6 of FIG. 1.
Figure 7:
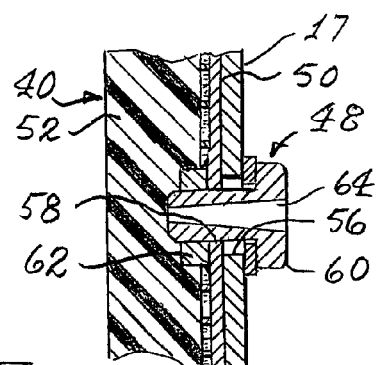
FIG. 7 is an enlarged fragmentary sectional view taken along the line 7-7 of FIG. 6.

The material to be processed in the cyclone 14 is in the form of a slurry which is a mixture usually of water and a range of different sized particles which are to be classified in the cyclone. The particles can be various minerals such as iron ore, coal and the like which are delivered from a grinding mill (not shown) to the cyclone by a suitable supply conduit 26 which is shown in dashed lines in FIG. 2. The slurry received from the conduit 26 passes through a transition duct section 28 located at the inlet end of the feed duct 16. The feed duct 16 is sometimes referred to as an "involute" in that, as best seen in FIG. 6, it directs the slurry in a curved flow path to an outlet which is tangential to the cylindrical head section 17 of the inlet housing 15. The slurry enters the cyclone 14 at high velocity and swirls around the vortex finder 20 in the head section 17 of the inlet housing 15. Due to the weight of the swirling slurry, peripheral portions of it, and particularly the larger particles, will tend to fall downward from the head section 17 into the conical housing 22 of the cyclone 14. The larger particles contained in the slurry will move downwardly through an apex cone 30 of frusto-conical configuration and a splash skirt 32 located at the apex end 24 of the conical housing 22 and will exit the cyclone 14 through an underflow outlet 34 provided at the open lower end of the splash skirt. A vortex is created within the apex cone 30 which carries a slurry of classified particles and water upwardly through the center of the conical housing 22 and the head section 17 of the inlet housing 15 and through the vortex finder 20 and the outlet nozzle 19 into a discharge duct 36 that is shown in dashed lines in FIG. 1.

In the mineral processing industry, large cyclones such as those having inlet head diameters of 26, 30 an 33 inches are normally used and due to the highly abrasive nature of the slurries, such cyclones are provided with abrasion resistant liners to prevent destruction of the cyclone housings. As will now be described in detail, the special liner system of the present invention significantly reduces, and in some instances eliminates, the previously described problems associated with replacing worn out prior art liners.

Reference is now made to FIGS. 3 through 8 wherein the multiple liners 38, 40 and 42 are shown as being used in the inlet housing 15 instead of the prior art one piece liner. The liner 38 used in the feed duct 16 includes a rigid substrate 44 to which an abrasion resistant material 46 is bonded. The rigid substrate 44 is formed of any suitable material such as metal, fiberglass, rigid urethane or the like, and the abrasion resistant material 46 is preferably a high energy (soft) material such as gum rubber, synthetic rubber or soft urethane. The liner 38 is configured to conform to the involute shape of the feed duct 16 and is of upwardly opening U-shape in-cross-section so as to line the bottom and side walls of the feed duct 16. The involute liner 38 is demountably fixed in the feed duct 16 by attachment means in the form of special fasteners 48 which will hereinafter be described in detail. The liners used in the cylindrical head section 17 of the inlet housing 15 are shown as being the two liners 40 and 42, however, more than two can be used. Both of the liners 40 and 42 have a rigid substrate 50 to which an abrasion resistant material 52 is bonded to the inner face of the substrate, with the substrate and abrasion resistant material preferably being the same as that used in the involute liner 38. The liners 40 and 42 are of arcuate configuration so as to conform to the interior surface of the cylindrical head section 17 of the inlet housing 15, and the previously mentioned special fasteners 48 are used to demountably secure the arcuate liners 40 and 42 in place. The involute and arcuate liners 38, 40 an 42 are formed with beveled end edges 54 at each location where the liners form a junction with each other to seal the joints at those locations.

In addition to mounting the involute and arcuate liners 38, 40 and 42 within their respective parts of the inlet housing 15, the special fasteners 48 briefly mentioned above act as wear detection devices that provide an indication that liner wear is nearing the point that a replacement operation should be scheduled. A typical one of the fasteners 48 is seen best in FIG. 7 as securing the arcuate liner 40 in contiguous engagement with the interior wall of the head section 17, and it will be understood that the following description will apply to each of the special fasteners. Aligned openings 56 and 58 are provided in the head section housing 17 and in the rigid substrate 50 respectively, and a bolt 60 extends through those openings into threaded engagement with a captive nut 62 that is welded or otherwise affixed to the interior surface of the rigid substrate 50 of the liner. The nut 62 is affixed to the substrate 50 prior to bonding of the abrasion resistant material 52 thereto and when the bonding is accomplished, the nut is buried in the material 52. The bolt 60 has an axial bore 64 formed there through and the bolt is sized so that when in threaded engagement with the nut 62, the inner end of the bolt 60 is at a predetermined depth below the inner surface of the abrasion resistant material 52. When the abrasive resistant material 52 wears to a point where the inner end of the bolt 60 is exposed, a small amount of the slurry will seep out through axial bore 64 of the bolt and thus provide a visual indication on the exterior of the inlet housing 15 that liner replacement will soon be needed. The axial bore 64 formed in the bolt 60 is preferably tapered with its small end located at the inner end of the bolt to prevent clogging of the axial bore by particles carried in the slurry. The buried depth of the inner end of the bolt 60 is such that when slurry leakage is seen, a sufficient thickness of the abrasion resistant 52 remains so that immediate liner replacement is not needed and can be scheduled at a convenient tine.

A special liner 66 is provided for use in the transition duct section 28 of the feed duct 16. The transition duct liner 66 is a one piece structure molded or otherwise formed of a suitable abrasion resistant material which is preferably the same as the material used in the liners 38, 40 and 42. The transition duct liner 66 is configured to change the flow of the incoming slurry from the round-in-cross-section configuration provided by the supply conduit 26 into the square-in-cross-section configuration of the feed duct 16. The transition duct liner 66 is formed with a flange 68 at its inlet end and the liner is held in place by its flange 68 being interposed between the flanges of the feed duct 16 and the supply conduit 26.

Figure 5:
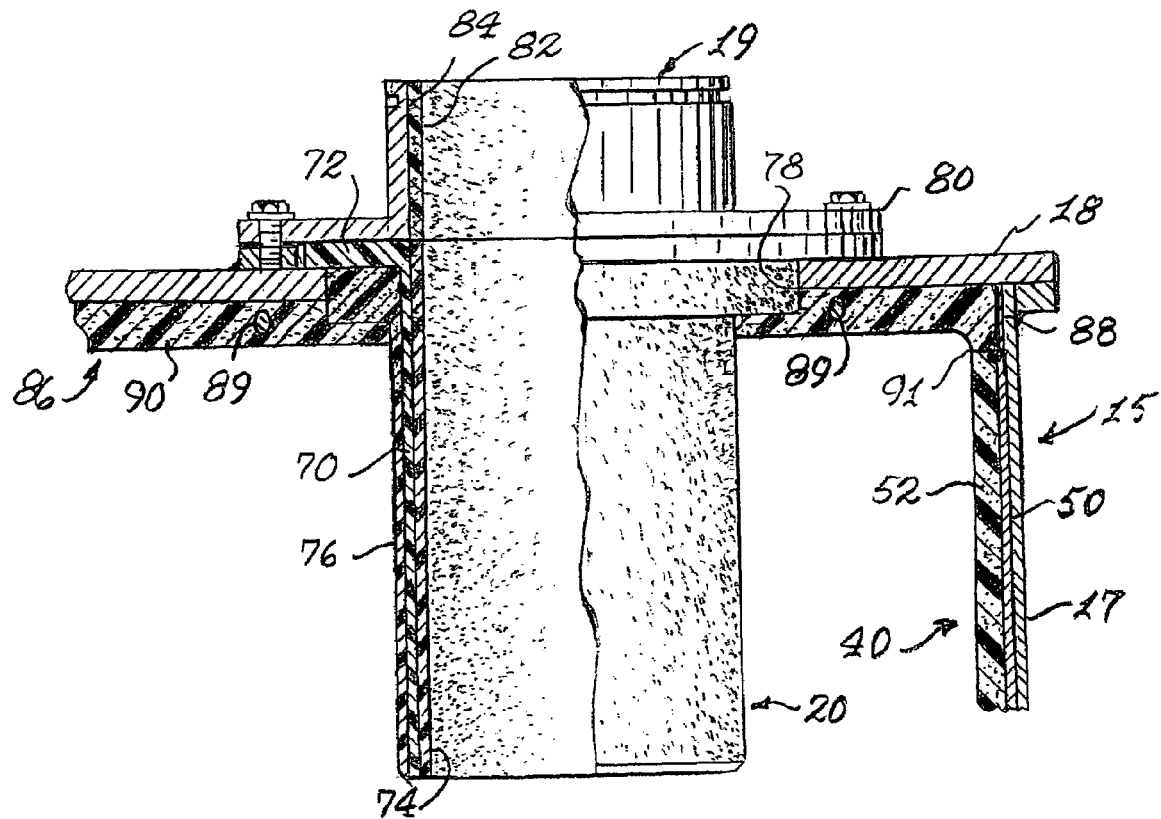
FIG. 5 is an enlarged fragmentary sectional view taken along the line 5-5 of FIG. 1.

As seen best in FIG. 5, the vortex finder 20 is preferably formed with a rigid tubular substrate 70 having a flange 72 at its upper end. An inner ceramic liner 74 is bonded to the inner surface of the tubular substrate 70 and an outer ceramic liner 76 is bonded to the exterior surface of the tubular substrate to provide the vortex finder with an extended life. The vortex finder 20 is demountably secured within an opening 78 formed in the cover plate 18 by having the flange 72 of its rigid substrate 70 located between the outer surface of the cover plate 18 and the flange 80 of the overflow nozzle 19 which is bolted to the cover plate. A liner 82 of suitable abrasion resistant material can be bonded within the bore 84 of the overflow nozzle 19.

Figure 8:
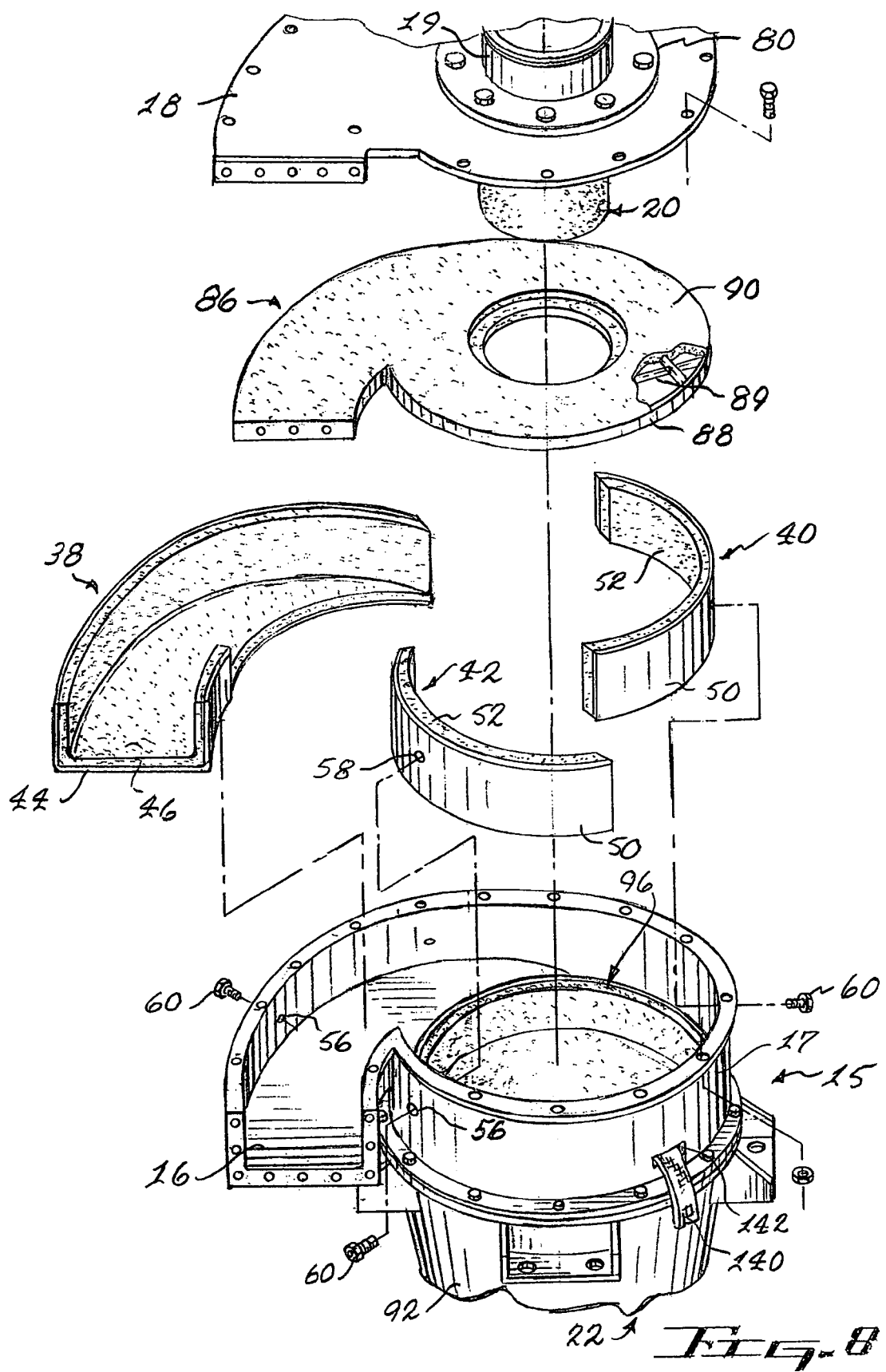
FIG. 8 is a perspective view showing the cover plate, cover plate liner, the feed duct liner and the inlet head liners exploded from open top of the cyclone.

The involute liner and the arcuate liners 38, 40 and 42 respectively, do not extend all the way up to the opening at the top end of the inlet housing 15. A cover plate liner 86 as seen best in FIG. 8, is preferably formed with peripheral metal band 88 and an internal frame 89 for supporting a suitable molded abrasion resistant material 90 having a depending peripheral lip 91. When the cover plate 18 and the cover plate liner 86 are in their assembled positions, the depending lip 91 of the cover plate liner 86 exerts a downward force on the top edges of the liners 38, 40 and 42 to seal the joint therebetween. The cover plate liner 86 may be simply placed in the open top of the inlet housing 15 or can be attached to the underside of the cover plate 18 by suitable fasteners (not shown).

The conical housing 22, which is customarily an assembly of two or more housings of truncated conical configuration, depends axially from the cylindrical head section 17 of the inlet housing 15 and is disposed so that its small apex end 24 is at the lower end of the conical housing. In the embodiment shown best in FIGS. 1 and 9, the conical housing 22 has an upper cone housing 92 and a lower cone housing 94 with the latter being of special configuration which will hereinafter be described in detail. The liners used in the conical housing 22 are of truncated conical configuration and include an upper cone liner 96 which is used to line the inner wall of the upper cone housing 92 and a middle cone liner 98 which is used to line the inner wall at the upper end of the lower cone housing 94. The upper and middle cone liners 96 and 98 are preferably made with a high energy (soft) abrasion resistant liner material 100 such as high energy urethane which is bonded to a rigid metallic substrate 102. The upper and middle cone liners 96 and 98 may be described as "drop-in" structures which fit in their proper positions within the conical housing 22 due to the matching tapered configurations of the cyclone housing and the liners. The inner wall at the lower end of the lower cone housing 94 is lined with a lower cone liner 104. The apex cone 30 and the splash skirt 32 depend axially from open apex end 24 of the conical housing 22. The lower end of the lower cone housing 94, the lower cone liner 104 and the apex cone 30 are especially configured to facilitate replacement of the liners 96, 98 and 104 along with the apex cone 30 and splash skirt 32 when those components become worn out.

The lower cone housing 94 is of downwardly tapering conical configuration for most of its axial length and deviates from conventional conical cyclone housings by being formed with a cylindrical lower portion 106. An annular ring-shaped shelf 108 extends inwardly into the opening at lower end of the cylindrical portion 106 of the lower cone housing 94 and a lifting ring 110 is supported on the upper surface of the shelf 108. The function and structural details of the lifting ring 110 will hereinafter be described in detail. The apex cone 30 has a rigid substrate 112 formed of a suitable material such as rigid urethane with a bonded liner 114 which is preferably formed of ceramic to better withstand the severe abrasive forces that occur within the apex cone 30. An annular flange 116 is formed on the substrate 112 and is disposed to circumscribe the open upper end of the apex cone 30. The apex cone is of tapered configuration for most of its axial length and has a cylindrical lower end 118 in the outer surface of which an annular groove 120 is provided. The annular flange 116 of the apex cone 30 is supported on the lifting ring 110 so that the apex cone depends axially through the opening at apex end 24 of the cylindrical portion 106 of the lower cone housing 94. The lower cone liner 104 has a rigid substrate 122 formed of a suitable material such as rigid urethane with a bonded liner 124 which is preferably formed of ceramic to better withstand the severe abrasive forces that occur in that area of the cyclone. The bonded liner 124 of the lower cone liner 104 is cone shaped as is the inner surface of the substrate 122, however, the lower portion of the outer surface of the substrate is cylindrical to provide a thickened wall 126 at the bottom end of the lower cone liner 104. The thickened wall 126 of the lower cone liner 104 is supported on the upper surface of the annular flange 116 of the apex cone 30.

The anti-splash skirt 32 has cylindrical tubular body 128 and is mounted so as to depend from the lower end of the apex cone 30. The tubular body 128 of the skirt 32 is formed of high energy (soft) urethane and has an inwardly extending flange 130 that circumscribes the open upper end of the skirt body. The inherently resilient nature of the skirt material allows it to be demountably attached to the cylindrical lower end 118 of the apex cone 30 by snapping the flange 130 of the skirt body 128 into the annular groove 120 of the apex cone. An optional snap-in elastomeric liner 132 can be installed inside the anti-splash skirt 32, and will be supported by an inwardly extending circular flange 134 formed at the bottom end of the skirt body 128.

Figure 11:
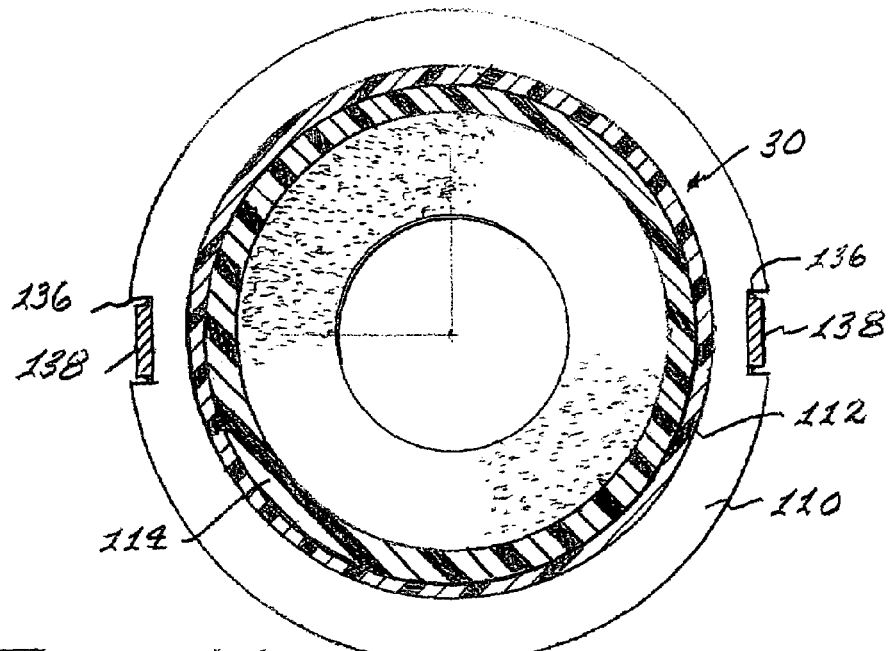
FIG. 11 is a sectional view taken along the line 11-11 of FIG. 9.
Figure 10:
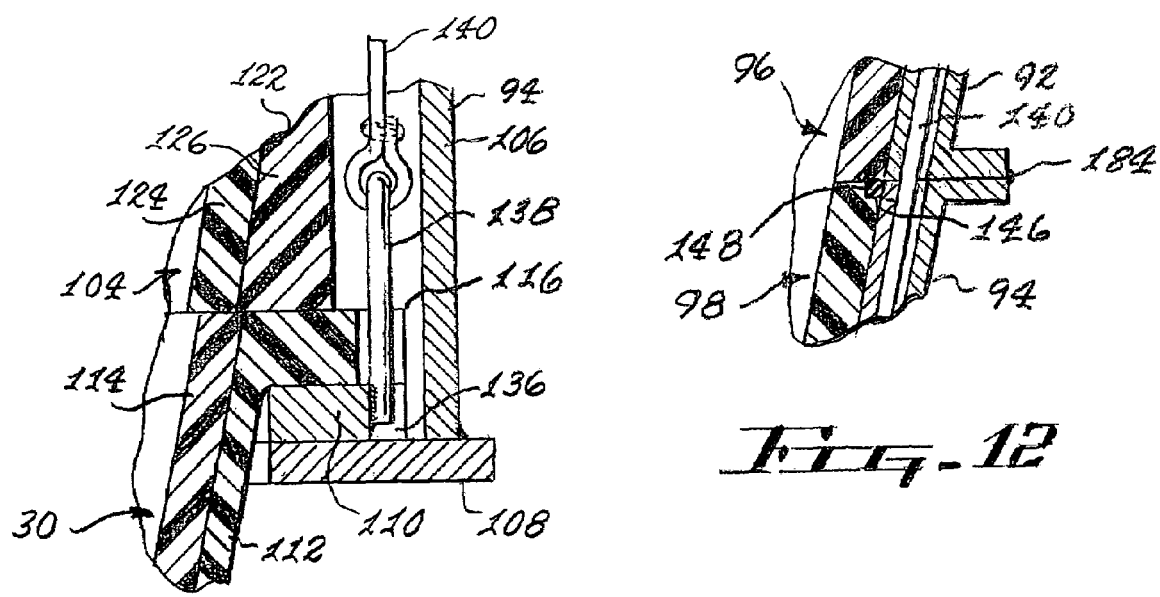
FIG. 10 is an enlarged fragmentary sectional view of the encircled portion 10 of FIG. 9.

As seen in FIG. 11, the lifting ring 110 has a pair of notches 136 formed at diametrically opposed sides thereof with a pair of upstanding tabs 138 each located in a different one of the notches and attached to the lifting ring 110 such as by welding. The tabs 138 extend upwardly from the ring 110 and the lower ends of a pair of hoisting straps 140 are each attached to a different one of the tabs. The hoisting straps 140 extend upwardly between the inner walls of the conical housing 22 and the periphery of the cone liners 96, 98 and 104. The upper ends of the hoisting straps 140 enter the lower end of the cylindrical head 17 of the inlet housing 15 and pass through slots 142 in the housing to the exterior of the cyclone 14. The hoisting straps 140, which have suitable connecting hardware such as D-rings 144 on their upper ends, are stored on the outside of the cyclone housing and are used in liner replacement operations as will be described below.

Figure 12:
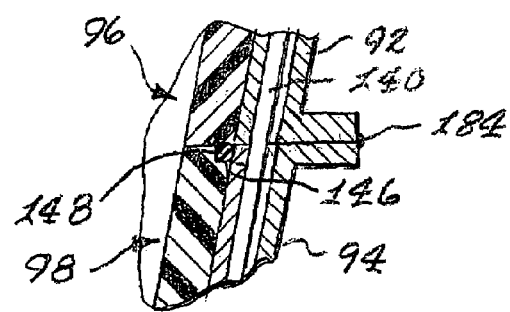
FIG. 12 is an enlarged sectional view of the encircled portion 12 of FIG. 9.

As previously mentioned, mounting of the cover plate 18 on the inlet housing 15 exerts a downward force which seals the joint between the depending lip 91 of the cover plate liner and the upper edges of the liners 38, 40 and 42. That same force is transmitted downwardly to seal the joints between the cone liners 96, 98 and 104. As seen in FIG. 12, wherein the joint between the upper and middle cone liners 96 and 98 is best seen, the integrity of the seal formed at that joint is assured by forming an annular groove 146 in the top edge of the lower cone liner 98 and installing an O-ring 148 in the groove. It will be understood that the groove 146 and O-ring 148 shown in FIG. 12 are intended to be typical of the seal configuration provided at joint between each of the liners 38, 40, 42, 86, 96, 98 and 104.

Figure 13A:
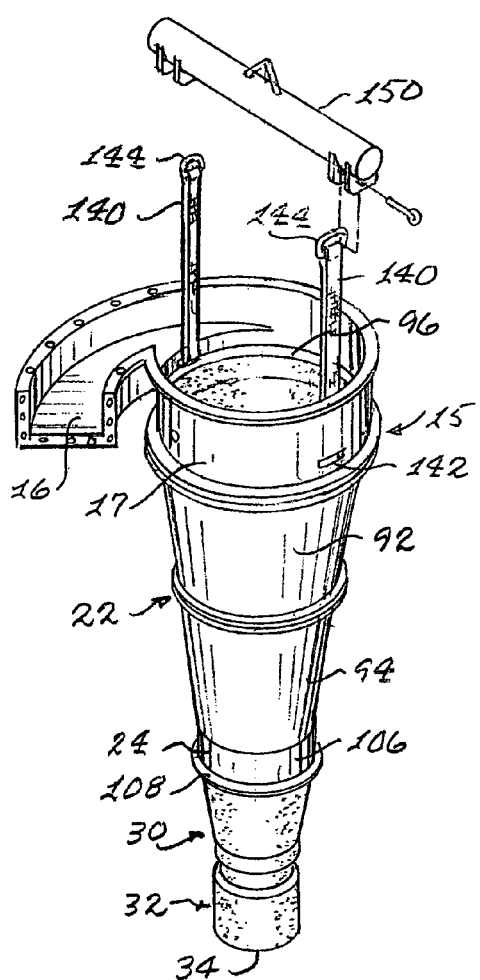
FIGS. 13a through 13c are perspective views of the cyclone housing illustrating some of the steps of the method of the present invention.
Figure 13B:
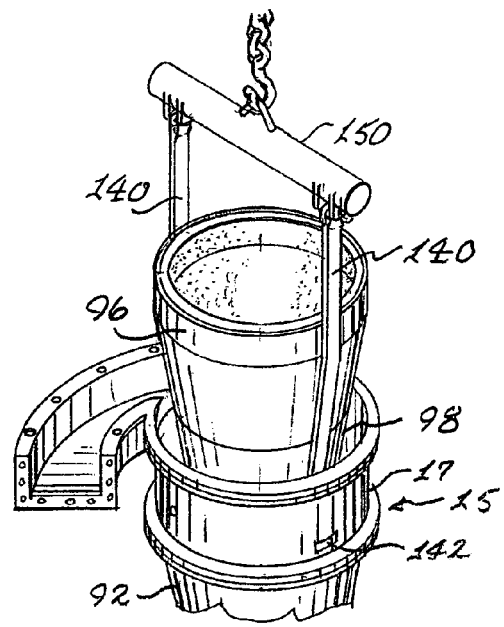
Figure 13C:
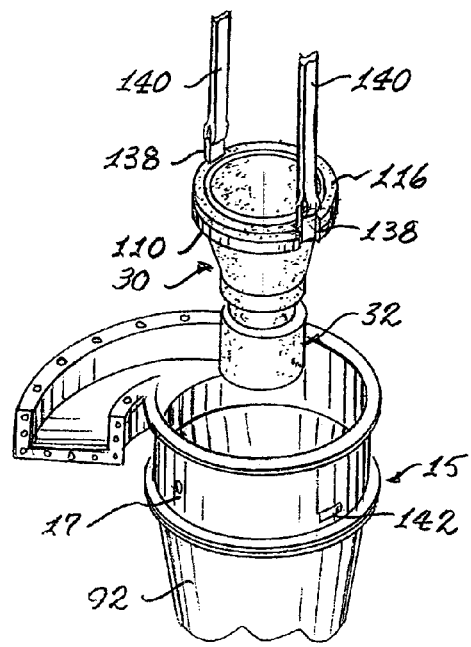

The cyclone liner replacement method of the present invention includes the initial step of disconnecting the cyclone 14 from the discharge duct 36 and, if the transition duct 28 is to be inspected and possibly replaced, slurry supply conduit 26 should be disconnected. The next step, which can be seen best in FIG. 8, includes removing the cover plate 18 and the cover plate liner 86. Then the special fasteners 48 are removed and the feed duct liner 38 and the arcuate liner segments 40 an 42 are lifted out of the inlet housing 15. In that there are three separate liners used in the inlet housing 15 each is relatively light and can be removed by hand. Referring now to FIGS. 13a through 13c, the next steps include fishing the hoisting straps 140 through the slots 142 into the interior of the inlet housing 15 followed by the step of connecting the D-rings 144 of the straps to the opposite ends of a bail 150. A suitable lifting mechanism, such as a crane (not shown), is then operated to move the bail 150 and axially pull the stacked array of liners 96, 98, 104, the apex cone 30 and the anti-splash skirt 32 to a first position wherein the upper cone liner 96 is clear of the open top of the inlet housing 15 as seen in FIG. 13b. Upon reaching this first position, operation of the lifting mechanism is interrupted and the upper cone liner 96 is manually removed from the stacked array. Operation of the lifting mechanism is then sequentially resumed and interrupted to move the stacked array into second and third positions (not shown) wherein the cones 98 and 104 are in turn removed manually form the stacked array. Final operation of the lifting mechanism raises the apex cone 30 and the anti-splash skirt 32 clear of the housing 22 as seen in FIG. 13c. The liner replacement operation is completed by a reversed sequence of the above described steps of the method of the present invention.

In view of the disclosed liner replacement system of the present invention, it will be noted that the only disassembly now required is removal of the cover plate 18 and the bolts securing the cover plate. Reference is now made to FIGS. 14, 15 and 16 wherein clamping means 152 and hinges 154 are shown which attach a cover plate 18a to the inlet housing 15. As seen in FIG. 14, a plurality of the clamping means 152 are used to secure the cover plate 18a. The clamping means 152 can be over-center latches, however, the swing bolts 152 as seen in FIG. 15 are preferred. The swing bolts 152 are mounted to the side of the inlet housing 15 by a clevis 156 which supports an axle 158. A sleeve 162 is provided on the lower end of the bolt 160 and the sleeve is mounted on the axle 158 so that the bolt 160 is pivotable between the solid and dashed line positions. In the solid line position, the bolt 160 extends upwardly through outwardly opening slots 164 formed in the flange 166 of the inlet housing 15 and in the cover 18a. A nut 168 is threadingly mounted on the bolt 160 to hold the cover in the mounted position, and loosening of the nut allows the bolt to be swung into the dashed line position. The cover 18a can be attached to the inlet housing 15 by using only the swing bolts 152, however it is preferred that the hinges 154 be used for reasons which will be described. The hinges 154 may be mounted in the position shown or any other suitable position with the structural details being shown in FIG. 16. A gusset 170 is mounted on the side of the inlet housing 15 and a hinge pin 172 extends oppositely from the gusset. A hinge plate 174 is mounted fast on the upper surface of the cover plate 18a and a spaced apart pair of L-shaped arms 176 are carried on the hinge plate. A sleeve 178 is mounted between the depending ends of the L-shaped arms 176 with the hinge pin 172 positioned in the bore 180 of the sleeve to allow the cover plate 18a to be moved from the closed position to an opened position as indicated by dashed lines.

Figure 17:
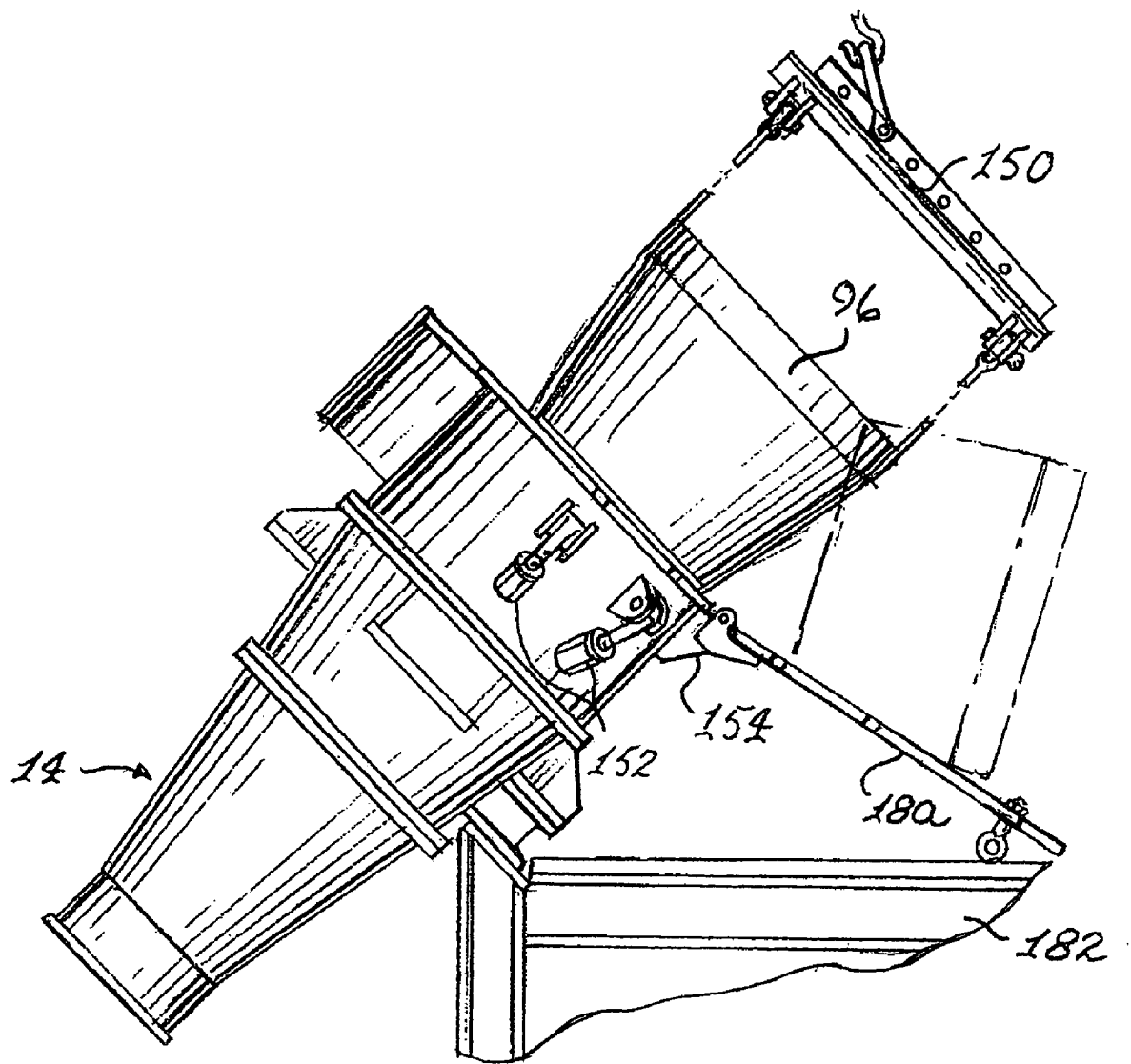
FIG. 17 is an elevational view of the cyclone showing it mounted in an angular disposition with the second embodiment of the cover plate shown in FIG. 14 being open to serve as a ramp in aiding the handling of the cone liners during a liner replacement operation.

In some installations cyclones are mounted in an inclined position as shown in FIG. 17. In such positions, the cover plate 18a can be swung into the open position so that it rests on the cyclone supporting structure 182. When in this position, the cover plate 18a acts as a ramp to aid in the handling of the cone liner 96 and the other cone liners handled during replacement operations. In some installations opening the cover plate 18a in this manner may not be possible and complete removal of the cover can be accomplished by removing the hinge pin 172.

When retrofitting existing cyclones to include the in-situ liner replacement system of the present invention, no changes need to be made in assembling a cyclone housing by bolting the plurality of housing components to each other. However, as a direct result of the liner replacement system of the present invention, new and improved cyclone housing assembly techniques and design will now be disclosed.

Figure 9:
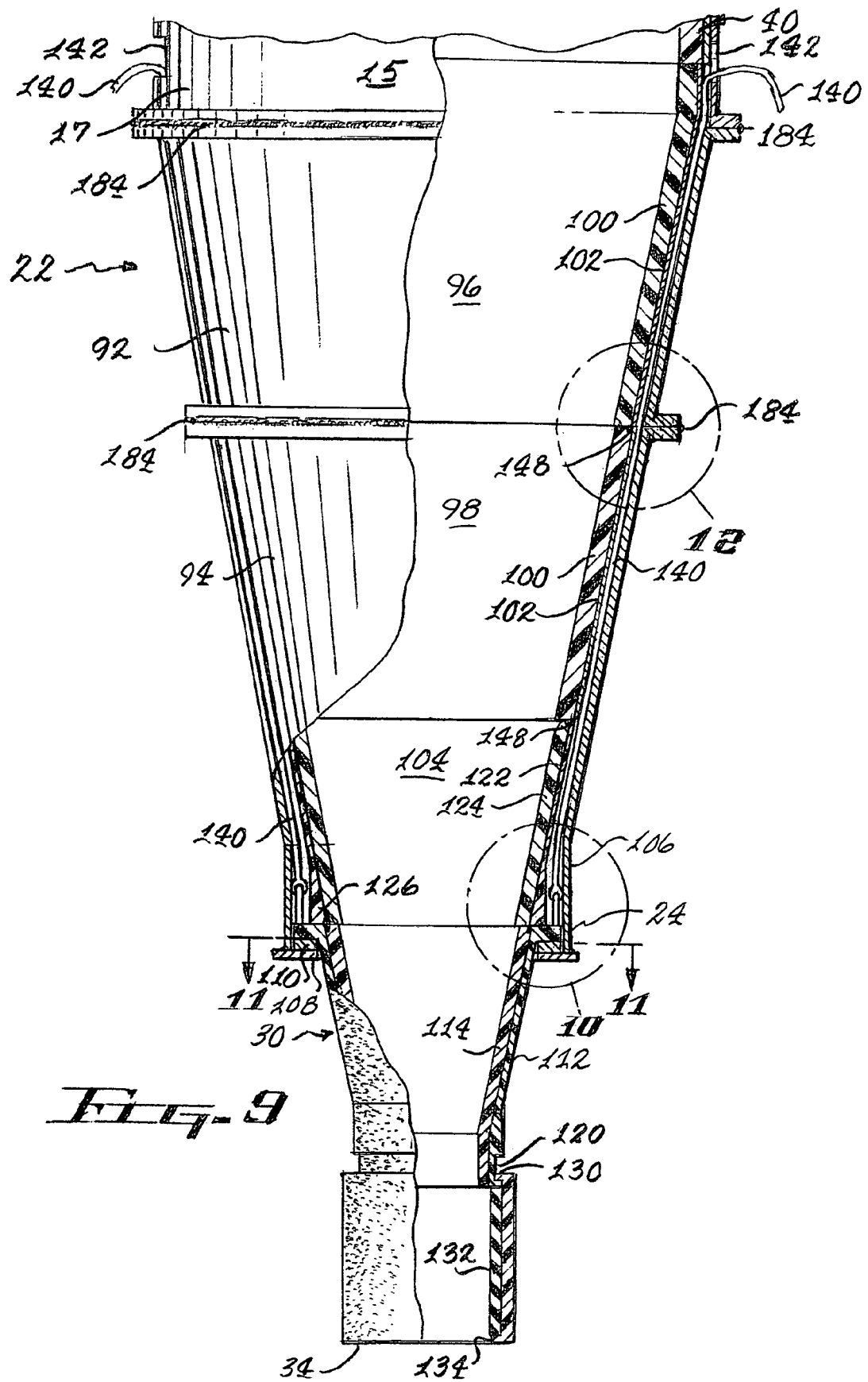
FIG. 9 is an enlarged elevational view partially broken away to show the various features of the conical housing, the apex cone and the splash skirt of the cyclone.

In a first embodiment, a change in the assembly technique is made by welding the separate components to each other as shown best at 184 in FIG. 9. In addition to eliminating the use of bolts, washers and nuts, using gaskets between the mating flanges will also be eliminated and the chances for developing leaks at the joints will be substantially reduced if not eliminated.

Figure 18:
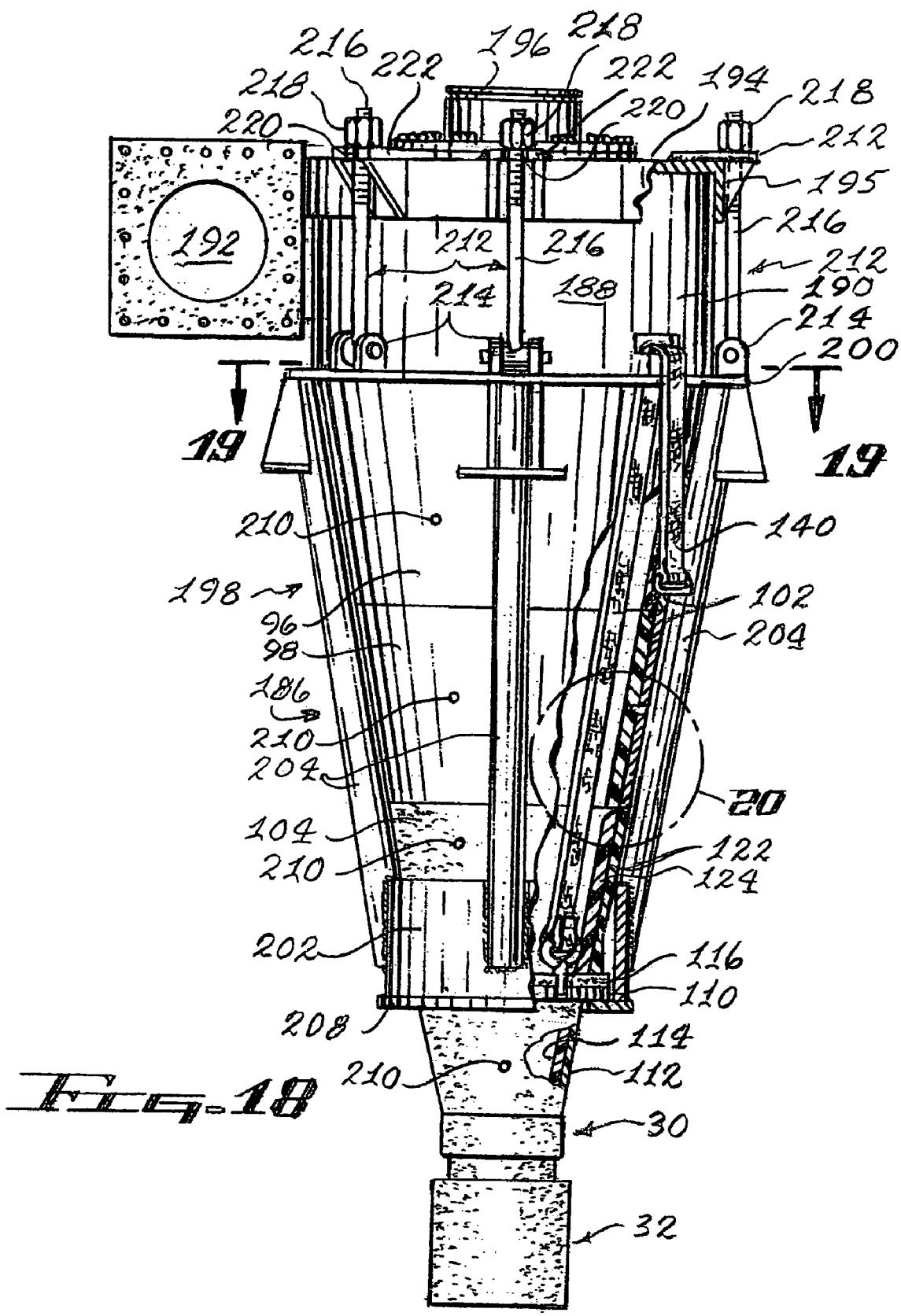
FIG. 18 is an elevational view similar to FIG. 1 showing another embodiment of the cyclone of the present invention with the cyclone being partially broken away to show the various features thereof.

In a second embodiment as seen in FIGS. 18 and 19, a modified cyclone housing 186, as hereinbefore described, includes the major components of an inlet housing 188 having a head section 190 and a feed duct 192. The open upper end of the inlet housing 188 is closed by a cover plate 194 having an apron 195 with an overflow nozzle 196 mounted on the cover plate, and a conical housing 198 depends axially from the open lower end of the head section 190 of the inlet housing 188. In addition to a modified assembly technique, which will hereinafter be described in detail, the major differences between the cyclone 186 and those hereinbefore disclosed are in the conical housing 198. The conical housing is provided with a flange 200 which circumscribes its open upper end and a sleeve 202 is provided at its lower apex end. The flange 200 and the sleeve 202 are interconnected by a plurality of struts 204 which may vary in number with it being preferred that at least four of the struts be provided. In addition, the struts 204 may be tubular as shown or they may be beams of any suitable shape such as I-beams. The struts 204 are disposed to taper downwardly from the flange to the sleeve and are radially spaced relative to each other to form the housing 198 into a cage-like structure having openings 206 about the periphery of the housing. A ring-shaped shelf 208 is provided at the open lower end of the sleeve 202 and the lifting ring 110 with its upwardly extending hoisting straps 140 (one shown in FIG. 18) is restingly supported on the shelf. The annular flange 116 of the apex cone 30 is in turn supported on the lifting ring 110 so that the apex cone 30 and the anti-splash skirt 32 depend axially from the conical housing 198. The cone liners 96, 98 and 104 are supported on the annular flange 116 of the apex cone 30 so as to form the stacked array which is removable in the manner set forth in the previously described liner replacement method of the present invention.

The open-sided conical housing 198 provides a clear view of the cone liners 96, 98, and 104 so that weep holes 210 formed at various locations in the cone liners are in plain view. It will be understood that the following description of the weep hole 210 shown in FIG. 19 will apply to all of the weep holes. The weep hole 210 is formed in the rigid substrate 102 of the cone liner 98 and extends into the abrasive resistant liner 100 a predetermined distance so that the inner end of the weep hole is buried below the inner surface of the liner 100. The abrasive nature of the slurry being processed in the cyclone will wear down the liner material 100 to a point where the inner end of the weep hole 210 becomes open to the inside of the cyclone. When this occurs a small amount of the slurry liquid will seep out through the weep hole 210 and provide a visual indication that a liner replacement operation should be scheduled.

The cyclone housing 186 has a plurality of swing bolt assemblies 212 each including a clevis 214 that is mounted on the flange 200 of the conical housing 198. An elongated bolt 216 having a nut 218 threadingly carried on its upper end is pivotably mounted in each clevis 214. Each of the bolts 216 extends upwardly from its clevis 214 through an outwardly opening slot 220 formed in a load-bearing plate 222 mounted on top of the cover plate 194. When in the position shown, the swing bolt assemblies 212 clamp the cover plate 194 on the inlet housing 188 and clamp the conical housing 198 to the bottom of the head section 190 of the inlet housing 188.

As previously mentioned, the upper and middle cones 96 and 98 have a soft abrasion resistant liner 100 such as rubber or high energy urethane bonded to their substrates 102 and the lower cone 104 has a ceramic liner 124 bonded to its substrate 122. Those liner materials are preferred due to their different characteristics which enable them to best withstand the different percussion and abrasion forces that occur within their particular areas of the cyclone. The different wear characteristics of the two dissimilar materials can cause a turbulence problem in the cyclone. The liner of soft material wears faster than the ceramic liner and when the soft material liner 100 reaches a thickness that is less than the thickness of the ceramic liner 124, the top edge of the ceramic liner will protrude into the cyclone further than the soft material liner. This is referred to in the industry as a "reverse step" and it produces turbulence by deflecting the downwardly moving slurry into the center of the cyclone which disrupts the flow of slurry and classified materials being carried upwardly by the vortex. This problem is eliminated, or at least substantially reduced, by forming a curved surface 224 on the inner edge of the top surface of the ceramic liner 124 as seen best in FIG. 20. The curved surface 224 is intended to anticipate the wearing down of the soft material liner 100 and may be a segment of a circle or an irregular curve as determined by the wear characteristics of the cyclone and the materials being classified therein. It will be understood that a curved surface similar to the surface 224 can be formed at any junction between dissimilar cyclone liner materials where turbulence resulting from a reverse step could occur.

While the principles of the invention have now been made clear in illustrated embodiments, many modifications will be obvious to those skilled in the art which do not depart from those principles. The appended claims are therefore intended to cover such modifications within the limits only of the true spirit and scope of the invention.

What I claim is:

1. A cyclone having an in-situ abrasive resistant liner removal system comprising in combination;
    a) an inlet housing having open top and bottom ends;
    b) a feed duct connected to said inlet housing for supplying materials to be classified thereto;
    c) a cover plate mounted atop said inlet housing and movable for opening the top of said inlet housing;
    d) a truncated conical housing depending from the open bottom end of said inlet housing and having an open apex at its lower end;
    e) a ring-shaped shelf at lower end of said conical housing and extending into the open apex thereof;
    f) a lifting ring resting on said ring-shaped shelf;
    g) a pair of hoisting straps attached to diametrically opposed sides of said lifting ring and extending upwardly through said conical housing;
    h) a frusto-conical apex cone having a downwardly tapering body with an annular flange circumscribing its upper end, the annular flange of said apex cone resting on said lifting ring with its body depending through the lower end of said conical housing;
    i) at least one frusto-conical abrasion resistant in said conical housing and mounted on the annular flange of said apex cone; and
    i) means on the upper ends of said hoisting straps for attachment to a lifting mechanism for moving said lifting ring, said apex cone and frusto-conical abrasion resistant cone out of the cyclone when said cover plate is moved to open the upper end of said inlet housing.

2. The combination of claim 1 wherein there are at least a pair of said frusto-conical abrasion resistant cones arranged in a stacked array atop the annular flange of said apex cone and further comprising;
    a) the lowermost one of said frusto-conical abrasion resistant cones having a groove formed in its upper edge; and;
    b) an O-ring in the groove formed in the lowermost one of said pair of cones for sealing the joint there between.

3. 1 The combination of claim 1 wherein said apex cone comprises:
    a) a rigid substrate having an annular groove formed in the peripheral surface proximate the lower end thereof; and
    b) a liner of abrasive resistant material bonded to the inside of said substrate.

4. The combination of claim 3 and further comprising a splash skirt demountably attached to the lower end of said substrate of said apex cone.

5. The combination of claim 4 wherein said splash skirt is an elastomeric tubular structure with an inwardly extending flange at its upper end, said splash skirt being removably snapped in-place within the annular grooved formed at the lower end of said substrate of said apex cone, said splash skirt having an inwardly extending flange at its lower end with a liner of elastomeric material removably snapped in-place within said splash skirt.

6. The combination of claim 1 and further comprising:
    a) a vortex finder depending from said cover plate into said inlet housing, said vortex finder including,
        i) a rigid substrate of tubular configuration;
        ii) an abrasion resistant ceramic liner bonded to the exterior of said substrate; and
        iii) an abrasion resistant ceramic liner bonded to the interior of said substrate.

7. A cyclone as claimed in claim 1 and further comprising:
    a) a plurality of clamping means mounted at spaced apart locations about said inlet housing for movement between a cover plate engaged position wherein said cover plate closes the top of said inlet housing to a cover plate disengaged position wherein said cover plate is movable to open the top of said inlet housing; and
    b) hinge means connected to said inlet housing and to said cover plate for movement of said cover plate between the inlet housing opening and closing positions.

8. A cyclone having an in-situ abrasive resistant liner removal system comprising in combination;

a) an inlet housing having an open bottom end;
b) a cover plate mounted atop said inlet housing and movable for opening the top thereof;
c) a truncated conical housing depending from the open bottom end of said inlet housing and having an open apex at its lower end; said conical housing including,
 i) a ring-shaped flange attached to the open bottom end of said inlet housing,
 ii) a sleeve defining the open apex of said conical housing,
 iii) a ring-shaped shelf at the lower end of said sleeve and extending into the open apex thereof, and
 iii) a plurality of struts having upper ends attached to said ring-shaped flange and lower ends attached to said sleeve, said struts being spaced apart relative to each other to provide said conical housing with a plurality of side openings;
d) a lifting ring resting on said ring-shaped shelf;
e) a pair of hoisting straps attached to diametrically opposed sides of said lifting ring and extending upwardly through said conical housing;
f) a frusto-conical apex cone having a downwardly tapering body with an annular flange circumscribing its upper end, the annular flange of said apex cone resting on said lifting ring with its body depending axially through the open apex of said conical housing;
g) at least two frusto-conical abrasion resistant cones in said conical housing, said cones arranged in an axially stacked array atop the annular flange of said apex cone; and
h) means on the upper ends of said hoisting straps for attachment to a lifting mechanism for moving said lifting ring, said apex cone and said stacked array of cones out of the cyclone when said cover plate is moved to open the upper end of said inlet housing.

9. A cyclone as claimed in claim 8 and further comprising a plurality of swing bolts mounted at spaced apart locations on said ring shaped flange of said conical housing for movement between a cover plate engaged position wherein said cover plate and said conical housing are in a clamped position on said inlet housing and a cover plate disengaged position for releasing the clamped positioning of said cover plate and said conical housing on said inlet housing.

10. A materials classifying cyclone having an inlet housing and a downwardly tapering truncated conical housing, said cyclone comprising:
a) a frusto-conical lower cone mounted in the conical housing of said cyclone, said lower cone and having a substrate with an abrasion resistant liner bonded to the inner surface of the substrate, said lower cone having a top surface;
b) a frusto-conical upper cone axially stacked on said lower cone and having a substrate with an abrasion resistant liner bonded to the inner surface thereof;
c) said abrasion resistant liner of said lower cone having a relatively long resistance to wear in comparison to the resistance to wear of the abrasion resistant liner of said upper cone; and
d) said lower cone having a curved surface formed on the inner edge of the top surface thereof to reduce turbulence produced in said cyclone when the thickness of the liner of said upper cone wears to a thickness which is less than the thickness of the liner of said lower cone.

11. The cyclone of claim 10 wherein the abrasion resistant liner of said lower cone is ceramic and the abrasion resistant liner of said upper cone is an elastomer.

12. A cyclone for classifying materials, said cyclone comprising:
a) an inlet housing for receiving materials to be classified and having an open bottom end;
b) a truncated conical housing depending from the open bottom end of said inlet housing and having an open apex at its lower end, said conical housing including,;
 i) a flange attached to the open bottom end of said inlet housing,
 ii) a sleeve defining the open bottom apex of said conical housing, said sleeve having a lower end;
 iii) a shelf at the lower end of said sleeve and extending into the open apex defined thereby:
 iiii) a plurality of struts having upper ends attached to said flange and lower ends attached to said sleeve, said struts being spaced apart relative to each other to provide said conical housing with a plurality of side openings;
c) an apex cone having a downwardly tapering body with a flange circumscribing its upper end, the flange of said apex cone resting on the shelf of said conical housing with its body depending axially through the open apex of said conical housing; and
d) at least one abrasion resistant liner mounted in said conical housing and resting atop the flange of said apex cone.

13. A cyclone as claimed in claim 12 wherein said apex cone comprises:
a) a rigid substrate; and
b) an abrasion resistant material bonded to the interior surface of said substrate.

14. A cyclone as claimed in claim 12 wherein said abrasion resistant liner comprises:
a) a rigid substrate; and
b) an abrasion resistant material bonded to the inner surface of said substrate.

15. A cyclone as claimed in claim 12 and further comprising:
a) said inlet housing having an open top; and
b) a cover plate mounted atop the open upper end of said inlet housing and being removable so that said abrasion resistant liner and said apex cone can be removed from said cyclone when worn out and replacements can be installed in said cyclone housing.

16. A cyclone as claimed in claim 12 and further comprising:
a) said inlet housing having an open top end;
b) a cover plate mounted on said inlet housing for closing the open top thereof; and
c) a plurality of swing bolts mounted at spaced apart locations on the ring shaped flange of said conical housing for movement between a cover plate engaged position wherein said cover plate and said conical housing are in a clamped position on said inlet housing and a cover plate disengaged position for releasing the clamped positioning of said cover plate and said conical housing on said inlet housing.

* * * * *